US008899475B2

(12) United States Patent
Deas et al.

(10) Patent No.: US 8,899,475 B2
(45) Date of Patent: Dec. 2, 2014

(54) MEDIA PRESENTER

(75) Inventors: Scott Deas, Dundee (GB); Ken Peters, Dundee (GB)

(73) Assignee: NCR Corporation, Duluth, GA (US)

( * ) Notice: Subject to any disclaimer, the term of this patent is extended or adjusted under 35 U.S.C. 154(b) by 834 days.

(21) Appl. No.: 12/868,842

(22) Filed: Aug. 26, 2010

(65) Prior Publication Data

US 2012/0048875 A1 Mar. 1, 2012

(51) Int. Cl.

*G06Q 40/00* (2012.01)
*B65H 31/30* (2006.01)
*G07D 11/00* (2006.01)

(52) U.S. Cl.

CPC .... *B65H 31/3063* (2013.01); *B65H 2301/4213* (2013.01); *B65H 31/3027* (2013.01); *B65H 2405/35* (2013.01); *G07D 11/0018* (2013.01); *B65H 2405/11162* (2013.01); *B65H 2403/512* (2013.01); *B65H 2405/325* (2013.01); *B65H 2405/1117* (2013.01); *B65H 2408/13* (2013.01); *B65H 2701/1912* (2013.01)

USPC .......... 235/379

(58) Field of Classification Search

USPC .......... 235/379

See application file for complete search history.

(56) References Cited

U.S. PATENT DOCUMENTS

| | | | | |
|---|---|---|---|---|
| 6,199,856 | B1 * | 3/2001 | Clauser et al. | 271/180 |
| 6,682,068 | B1 * | 1/2004 | Haney et al. | 271/228 |
| 2005/0035531 | A1 * | 2/2005 | Sasaki et al. | 271/126 |
| 2009/0284556 | A1 * | 11/2009 | Okazawa et al. | 347/8 |

* cited by examiner

*Primary Examiner* — Michael G Lee
*Assistant Examiner* — David Tardif
(74) *Attorney, Agent, or Firm* — Paul W. Martin

(57) ABSTRACT

A media presenter is described. The media presenter comprises: a chassis including a nose coupled thereto, and including (i) a presenting end distal from the chassis, and (ii) a presenting track extending from the chassis to the presenting end. The media presenter also includes a carriage mounted on the presenting track for movement therealong, and comprising a carriage body coupled to a carriage plate by a linkage, the carriage plate including a cam follower. The media presenter also includes a cam block defining a cam track and being operable to engage with the cam follower to move the carriage between an open position at which media items can be placed on the carriage plate, and a closed position for clamping media items between the carriage plate and the carriage body.

16 Claims, 13 Drawing Sheets

FIG. 4
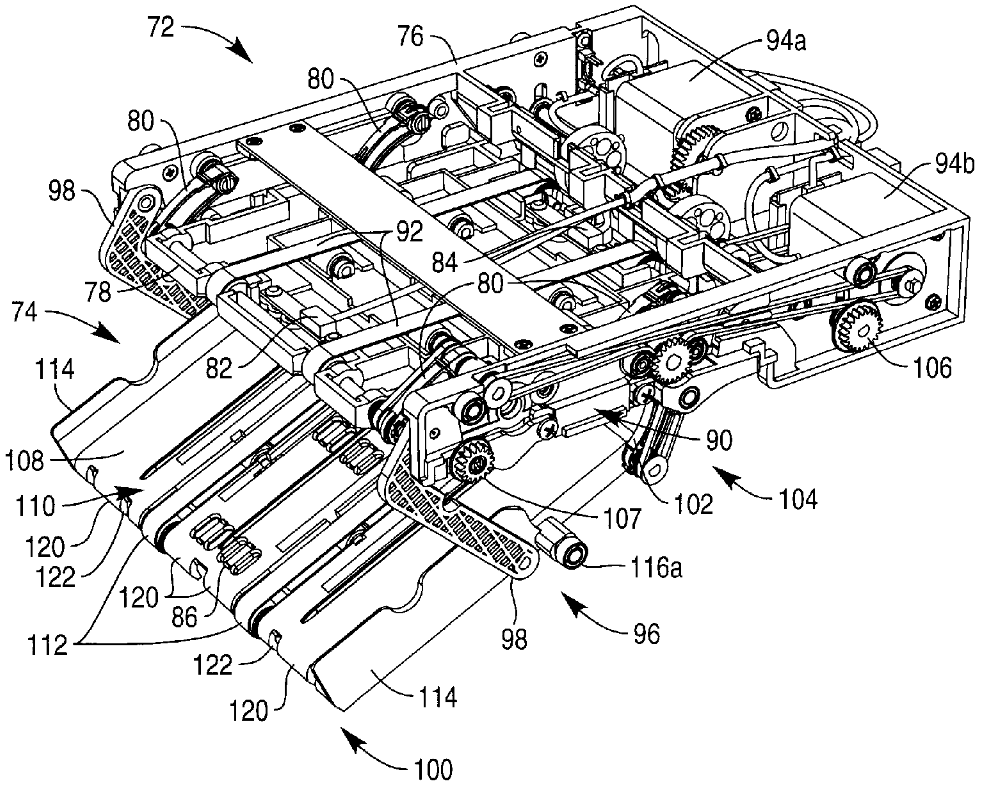
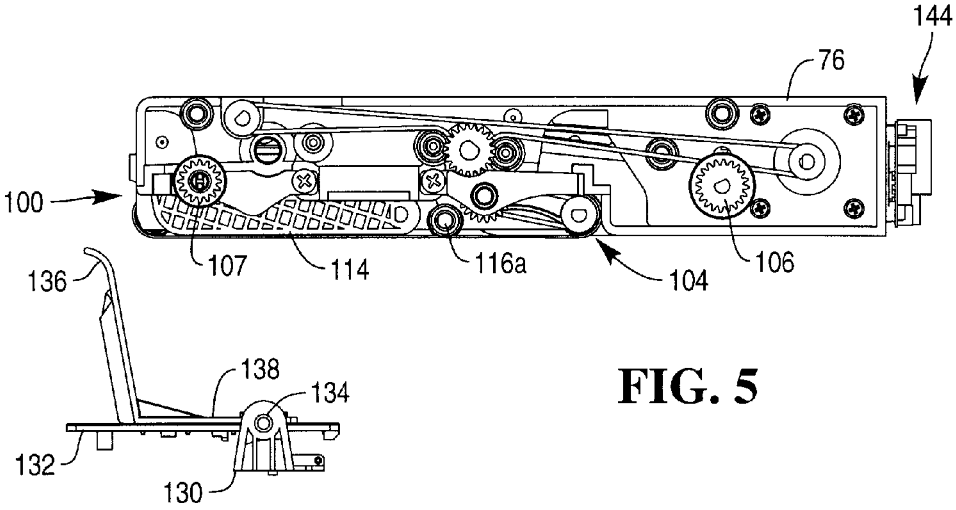
FIG. 5

FIG. 8
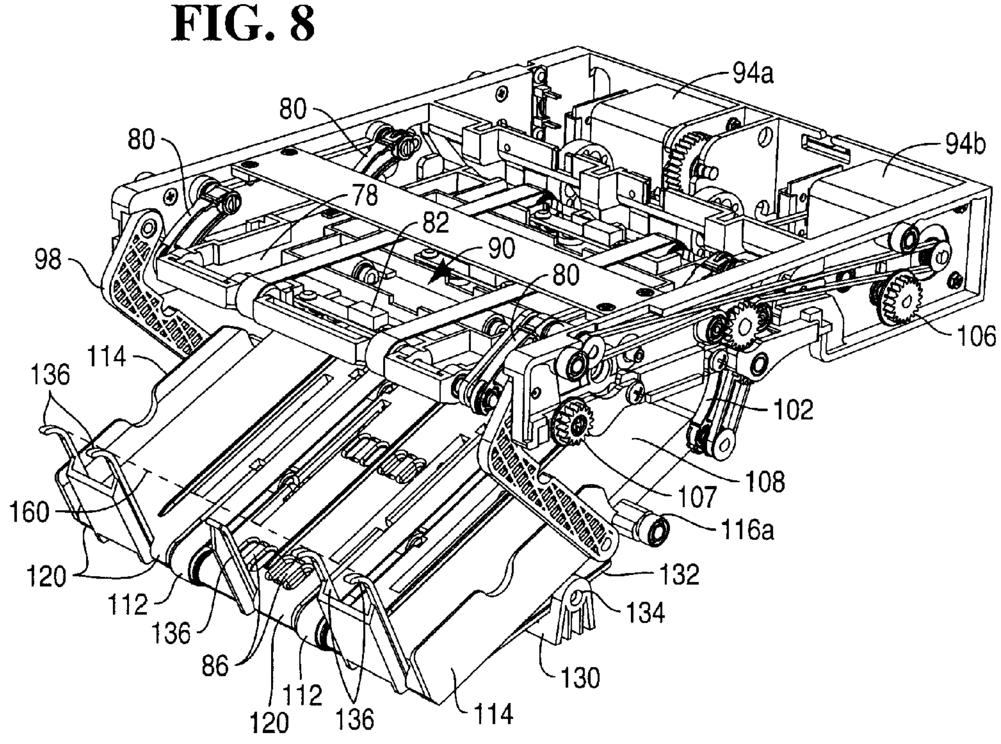
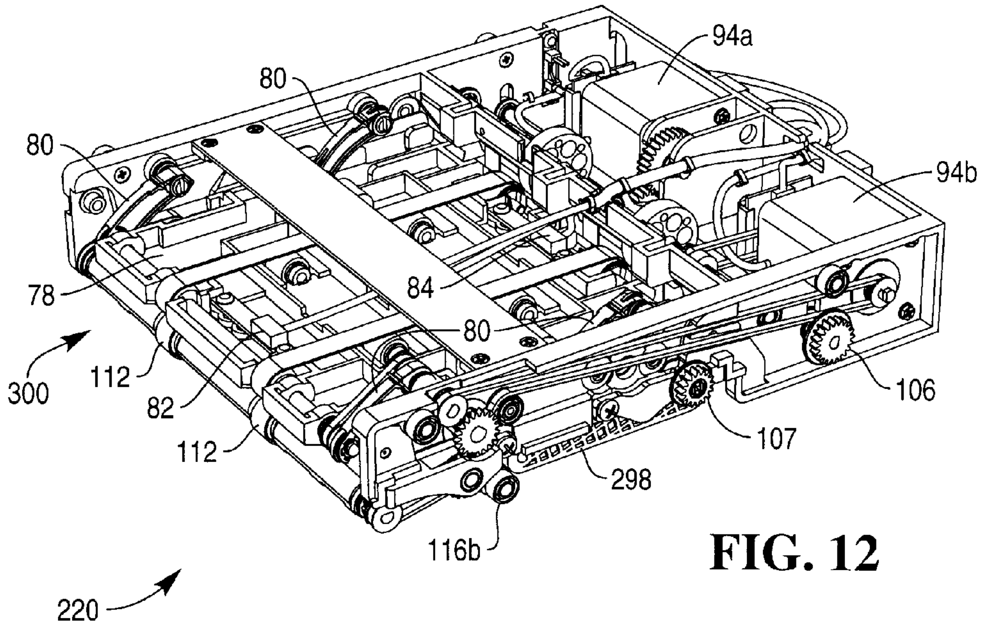
FIG. 12

FIG. 13
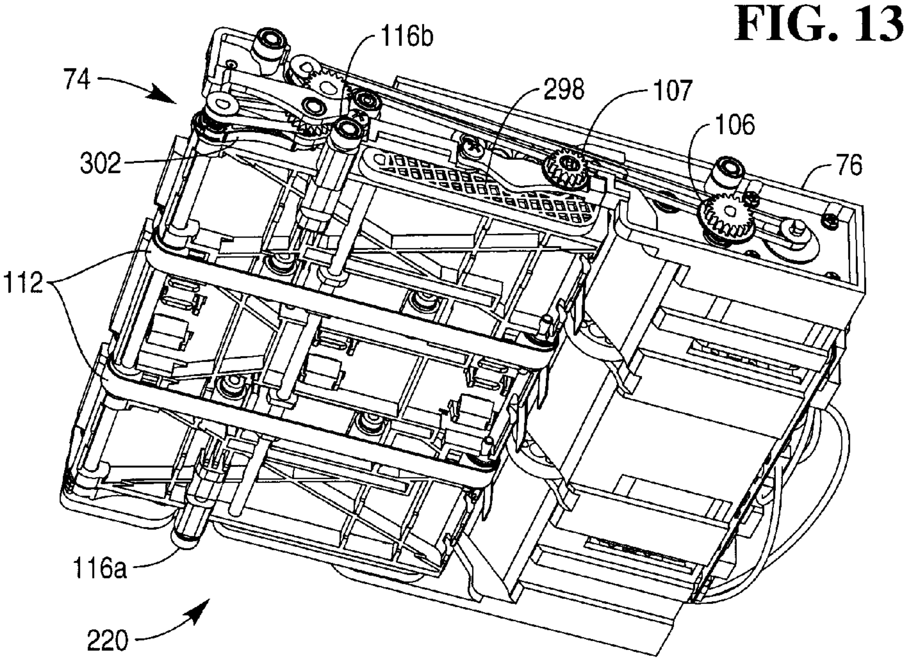
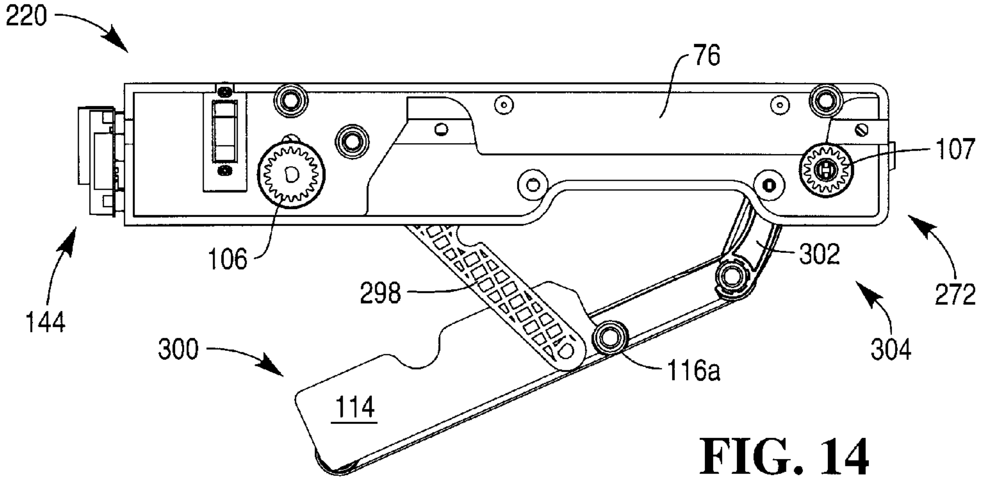
FIG. 14

MEDIA PRESENTER

FIELD OF INVENTION

The present invention relates to improvements in or relating to a media presenter.

BACKGROUND OF INVENTION

A media presenter is used as part of a media dispenser. A media presenter is that part of the dispenser that presents media items to a customer. One common type of media dispenser is a bunch sheet media dispenser for dispensing a bunch (or stack) of media items in sheet form (such as banknotes, tickets, coupons, and the like).

A bunch media presenter is typically coupled to one or more media pick units. Each media pick unit picks individual media items from a media cassette (or a hopper) stored therein, and transports the picked media item to the media presenter for collating the media items into a bunch (for example, using a ballistic stacker or a stacking wheel), and then presenting the bunch of media items to a customer. If the customer does not remove the presented bunch, then the presenter withdraws the bunch and transports it to a purge bin.

Some media dispensers are front access, which means that media cassettes are inserted into the media dispenser at the same side of the media dispenser at which media items are dispensed to a customer. Other media dispensers are rear access, which means that media cassettes are inserted into a media dispenser at the opposite side of the media dispenser at which media items are dispensed to a customer.

It would be desirable to provide an improved media item presenter.

SUMMARY OF INVENTION

Accordingly, the invention generally provides methods, systems, and apparatus for an improved media presenter.

In addition to the Summary of Invention provided above and the subject matter disclosed below in the Detailed Description, the following paragraphs of this section are intended to provide further basis for alternative claim language for possible use during prosecution of this application, if required. If this application is granted, some aspects may relate to claims added during prosecution of this application, other aspects may relate to claims deleted during prosecution, other aspects may relate to subject matter never claimed. Furthermore, the various aspects detailed hereinafter are independent of each other, except where stated otherwise. Any claim corresponding to one aspect should not be construed as incorporating any element or feature of the other aspects unless explicitly stated in that claim.

According to a first aspect there is provided a media presenter comprising: a chassis including a nose coupled thereto, and including (i) a presenting end distal from the chassis, and (ii) a presenting track extending from the chassis to the presenting end; a carriage mounted on the presenting track for movement therealong, and comprising a carriage body coupled to a carriage plate by a linkage, the carriage plate including a cam follower; and a cam block defining a cam track and being operable to engage with the cam follower to move the carriage between an open position at which media items can be placed on the carriage plate, and a closed position for clamping media items between the carriage plate and the carriage body.

The media presenter may further comprise a track shelf parallel to the presenting track and arranged to support the cam follower to prevent the carriage from moving to the open position, the track shelf further defining a cam block gap at a loading position, the cam block being mounted in registration with the cam block gap.

The cam block may define a ledge arranged to align with, and dimensioned to fill, the cam block gap so that when the cam is rotated to position the ledge parallel to the track, the ledge completes the track shelf so that the cam follower does not engage with the cam track, thereby allowing the carriage to move beyond the loading position at which the carriage plate is moved between the closed position and the open position.

The cam block may further define a lead-in track adjacent the cam track, where the cam block may be rotated to align the lead-in track with the track shelf when the carriage is to be moved to the loading position.

The lead-in track may be located near a pick end of the presenter and the cam track may start near a handle end of the presenter, so that the carriage can be moved along the lead-in track to present media items to a customer in a rear access dispenser, but the carriage must be moved towards the pick end, and the cam block rotated to the ledge position, prior to moving the carriage to present media items to a customer in a front access dispenser.

The cam block may comprise a block of material in the shape of a circle, an ellipse, a polygon, or any other convenient shape.

The cam block may include a toothed circumference for receiving drive from a cam motor, either directly or via one or more gears.

The cam block may define a curved cam track starting adjacent the lead-in track and finishing at an offset centre point.

The curved cam track may define (i) a downwards cam surface for moving the cam follower down to open the carriage, and (ii) an upwards cam surface opposite the downwards cam surface, for moving the cam follower up.

The cam follower may comprise an arm (such as a pin or rod) extending laterally from the carriage plate.

The cam block may be mounted on a shaft, and the cam block may include a position sensor that senses a target mounted on the cam block shaft to ascertain a rotational position of the cam block.

According to a second aspect there is provided a method of presenting a bunch of media items to a customer, the method comprising: moving a carriage along a presenting track until the carriage reaches a loading position; guiding a cam follower on the carriage in a first direction along a cam track to open the carriage and reveal an upper surface of a carriage plate spatially separated from a carriage body; transporting individual media items onto the upper surface of the carriage plate to form a bunch of media items; guiding the cam follower on the carriage in a second direction, opposite the first direction, along the cam track to close the carriage and pinch the bunch of media items between the upper surface of the carriage plate and a lower surface of the carriage body; moving the carriage along the presenting track until the carriage reaches a present position; and transporting the bunch of media items from the carriage to a customer.

The method may comprise the further steps of: detecting that one or more media items in the bunch of media items have not been removed by the customer; rotating the cam block to a ledge position at which a lead-in track to the cam track is replaced by a ledge track so that the cam follower is not guided along the cam track when the carriage is at the loading position; moving the carriage along the presenting track from the present position to a purge position; and transporting the detected media items out of the carriage and into a purge container.

The step of moving the carriage along the presenting track from the present position to a purge position may include moving the carriage beyond the loading position.

According to a third aspect there is provided a cam block for use with a carriage in a media presenter, the cam block defining: a lead-in track extending from an edge of the cam block to a cam track entrance; a cam track extending from the cam track entrance to an offset centre point, and defining an upward cam surface and a downward cam surface; a ledge extending from one edge of the cam block to an opposite edge of the cam block; and a hub for enabling the cam block to be rotatably mounted on a shaft in the media presenter.

According to a fourth aspect there is provided a media presenter comprising: a chassis including a nose coupled thereto, and including (i) a presenting end distal from the chassis, and (ii) a presenting track extending from the chassis to the presenting end; a carriage mounted on the presenting track for movement therealong, and comprising a carriage body coupled to a carriage plate by a linkage, the carriage plate including a cam follower; and a cam block defining a cam track and being operable to engage with the cam follower to move the carriage between an open position at which media items can be placed on the carriage plate, and a closed position for clamping media items between the carriage plate and the carriage body.

The media presenter may further comprise a track shelf parallel to the presenting track and arranged to support the cam follower to prevent the carriage from moving to the open position, the track shelf further defining a cam block gap at a loading position, the cam block being mounted in registration with the cam block gap.

The cam block may define a ledge arranged to align with, and dimensioned to fill, the cam block gap so that when the cam is rotated to position the ledge parallel to the track, the ledge completes the track shelf so that the cam follower does not engage with the cam track, thereby allowing the carriage to move beyond the loading position at which the carriage plate is moved between the closed position and the open position.

The cam block may further define a lead-in track adjacent the cam track, where the cam block may be rotated to align the lead-in track with the track shelf when the carriage is to be moved to the loading position.

In some embodiments, the lead-in track may be located near a pick end of the presenter and the cam track may start near a handle end of the presenter, so that the carriage can be moved along the lead-in track to present media items to a customer in a rear access dispenser, but the carriage must be moved towards the pick end, and the cam block rotated to the ledge position, prior to moving the carriage to present media items to a customer in a front access dispenser.

The cam block may comprise any convenient shape, such as a circle, a rectangle, a triangle, or the like. A circular shape may be most convenient as the circumference may comprise a toothed portion to receive drive from and/or provide drive to a gear.

The cam block may define a curved cam track starting adjacent the lead-in track and finishing at an offset centre point.

The curved cam track may define (i) a downwards cam surface for moving the cam follower down to open the carriage, and (ii) an upwards cam surface opposite the downwards cam surface, for moving the cam follower up.

The cam follower may comprise a bearing mounted on a pin extending laterally from the carriage plate.

The cam block may be mounted on a shaft, and the cam block may include a position sensor that senses a target mounted on the cam block shaft to ascertain a rotational position of the cam block.

According to a fifth aspect there is provided a media dispenser comprising a pick unit coupled to the media presenter of the first aspect.

According to a sixth aspect there is provided a self-service terminal incorporating the media dispenser of the fifth aspect. The self-service terminal may be an automated teller machine.

According to a seventh aspect there is provided a controller programmed to implement the steps of the second aspect.

According to a eighth aspect there is provided a media presenter that is reversible for use with either a front access or a rear access dispenser, the media presenter comprising:

a chassis including a central track;

a nose coupled to the chassis and including (i) a presenting end distal from the chassis, and (ii) a nose track arranged to couple to the central track to provide a continuous track from the chassis to the presenting end; and a removable track coupled to the chassis at an end opposite the nose, and arranged to couple to the central track to provide a presenting track that extends from one end of the chassis, through the opposite end of the chassis, and to the presenting end.

By virtue of this aspect, a media presenter can be configured with the nose at either end of the chassis (and the removable track at the opposite end of the chassis to the nose), so that the media presenter can be used on either a front access dispenser or a rear access dispenser.

The media presenter may further comprise a carriage mounted on the presenting track for movement therealong, and comprising: a carriage body and a carriage plate coupled thereto by a linkage, the carriage plate being movable between an open position at which media items can be placed on the carriage plate, and a closed position for clamping media items between the carriage plate and the carriage body.

The linkage may comprise pairs of link arms so that the linkage can be reconfigured to allow the carriage body to be mounted in either of two positions (each rotated 180 degrees relative to the other), but with a media entrance end of the carriage facing the same direction for each of the two positions. This allows the same parts to be used for a carriage that is to be mounted in a front access dispenser and a rear access dispenser.

The central track may extend from an end of the chassis opposite the nose (the blank end) to the nose end of the chassis. Alternatively, the media presenter may comprise a removable track mounted on the chassis at the blank end, and arranged to couple to, and align with, the central track to provide a presenting track that extends from the blank end of the chassis, through the nose end of the chassis, and to the presenting end of the nose. The removable track may be of similar dimensions to the portion of the nose that is in contact with the chassis. This allows the media presenter to be configured with the nose at either end of the chassis (and the removable track at the opposite end of the chassis to the nose), so that the media presenter can be used on either a front access dispenser or a rear access dispenser.

The nose track, the central track, and the removable track may each provide a track shelf portion arranged to support a portion of the carriage. The portion of the carriage may comprise a cam follower (for example, in the form of a bearing (such as a plain or ball bearing) mounted on a pin, rod, or other shaft, the mounted bearing extending laterally from the carriage plate).

The carriage body may comprise: a carriage chassis; an upper plate mounted on the chassis and resiliently biased towards the carriage plate; an upper transport section mounted to the upper plate and including a plurality of stretchable belts; and a transport motor mounted on the chassis for energizing the upper transport section. The carriage body may further comprise a carriage motor for moving the carriage along the presenting track.

The linkage may comprise a plurality of link arms coupling the carriage plate to the carriage body at one end (the media entrance end) and a plurality of link arms coupling the carriage plate to the carriage body at the opposite end (the non-entrance end). The link arms may cause the carriage plate to move downwards at the media entrance end more than at the non-entrance end. To achieve this, the linkage may comprise a pair of link arms at the media entrance end that are longer than a pair of link arms at the non-entrance end. Alternatively, the linkage may cause the carriage plate to move downwards parallel to the carriage body. The linkage may implement a four-bar linkage.

Instead of a plurality of pairs of link arms, the carriage body may be coupled to the carriage plate by a pair of link arms at the media entrance end and a pivot at the non-entrance end.

One advantage of using a plurality of pairs of link arms rather than a pair of link arms and a single pivot is that the carriage plate can be maintained at a shallower slope (or horizontal) using a plurality of pairs of link arms. A shallow slope makes it less likely that media items placed on the carriage plate will move when the carriage plate is moved to the closed position. Furthermore, using a plurality of pairs of link arms enables the carriage plate to be brought towards the carriage body in a position generally parallel to the carriage body, thereby reducing the pinch force on a bunch of stacked media items at the non-entrance end when the carriage plate approaches the closed position.

The carriage plate may further comprise: a cam follower; and a lower transport section including a plurality of stretchable belts. The transport motor mounted on the chassis may also be operable to energize the lower transport section.

The motors may be coupled to a control board (not shown) via an umbilical connector. The control board (not shown) may be mounted on the chassis.

The linkage may comprise link arms so that the linkage can be reconfigured to allow the carriage body to be mounted in either of two positions (each rotated 180 degrees relative to the other), but with the media entrance end of the carriage facing the same direction for each of the two positions. This allows the same parts to be used for a carriage that is to be mounted in a front access dispenser and a rear access dispenser.

The media presenter may further comprise a media item transport unit arranged to receive a picked media item from a pick unit and to transport the picked media item to the carriage when the carriage plate is in the open position. The media item transport unit may be operable to divert a transported media item to a purge compartment of a purge container if the media item does not meet an acceptance criterion (such as the media item being thicker than permitted, which may indicate multiple superimposed media items being transported as a single item, the media item being skewed, the media item being torn, or the like).

The media item transport unit may further comprise: a media item thickness sensor for detecting multiple superimposed media items, skewed media items, and the like. The media item thickness sensor may use an optical, mechanical and/or magnetic system to detect the thickness of a media item. Media item thickness sensors are well known.

The media item transport unit may further comprise first media flickers located at, and deflected by, an exit port to flick media items towards the media entrance end of the carriage as media items exit the media item transport unit. The media item transport unit may further comprise second media flickers also located at, and deflected by, the exit port to flick media items downwards onto the carriage plate after the media items have exited the media item transport unit. The second media flickers may be mounted co-axially with the first media flickers. The second media flickers may be longer than the first media flickers so that the first media flickers clear the exit port at the same time as a media item is being ejected therethrough, but the second media flickers do not clear the exit port until after that media item has been ejected therethrough.

The media presenter may further comprise a purge container. The purge container may comprise a first compartment including a slot aligned with a divert path of the media item transport unit, so that a media item being transported can be re-directed to the first compartment using a divert gate in the media item transport unit.

The purge container may further comprise a second compartment including a slot transverse to the presenting track to allow a bunch of media items that have been stacked in the carriage plate to be ejected from the carriage and dropped into the second compartment without being presented to a customer.

The purge container may further comprise a third compartment including a slot transverse to the presenting track to allow a bunch of media items that have been presented to a customer to be ejected from the carriage and dropped into the third compartment.

The media items may comprise banknotes, tickets, coupons, or the like.

For clarity and simplicity of description, not all combinations of elements provided in the aspects recited above have been set forth expressly. Notwithstanding this, the skilled person will directly and unambiguously recognize that unless it is not technically possible, or it is explicitly stated to the contrary, the consistory clauses referring to one aspect are intended to apply *mutatis mutandis* as optional features of every other aspect to which those consistory clauses could possibly relate.

These and other aspects will be apparent from the following specific description, given by way of example, with reference to the accompanying drawings.

BRIEF DESCRIPTION OF THE DRAWINGS

FIG. 4 is a perspective view of part (the carriage) of the media presenter of FIG. 1 in an open position;

FIG. 5 is a side view of the carriage of FIG. 4 in a closed position and another part (the registration device) of the media presenter of FIG. 1;

FIG. 8 is a perspective view of the carriage and registration device of FIG. 5, with the carriage in the open position and engaged with the registration device;

FIG. 12 is an upper perspective view of part (the carriage) of the media presenter of FIG. 11 in a closed position;

FIG. 13 is a lower perspective view of the carriage of FIG. 12 in a closed position;

FIG. 14 is a left-side view of the carriage of FIG. 12 in an open position;

Figure 1:
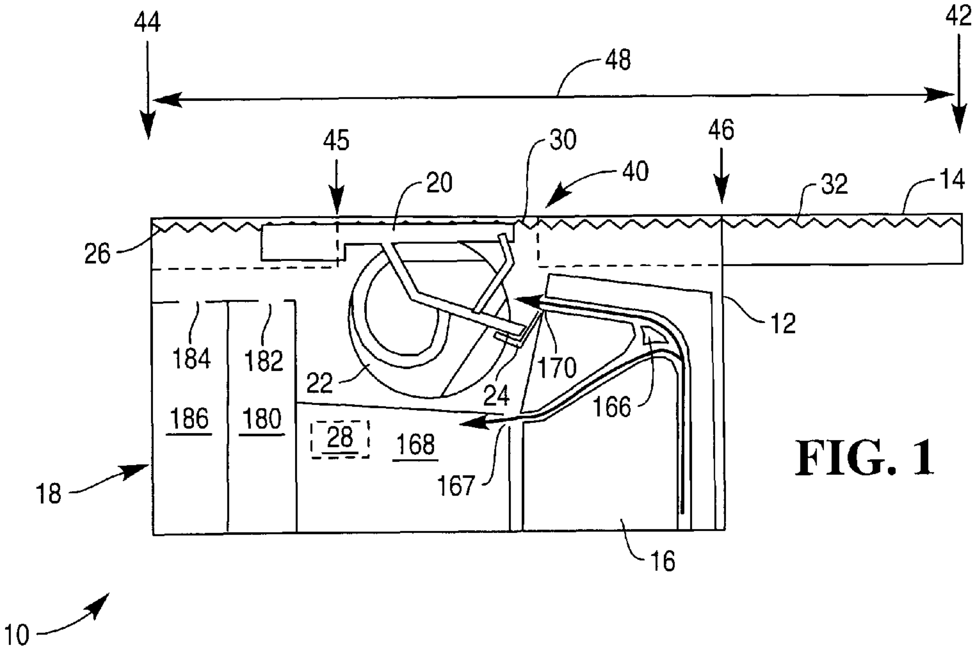
FIG. 1 is a simplified schematic diagram of a rear access media item presenter according to one embodiment of the present invention.

It should be appreciated that some of the drawings provided are based on computer renderings from which actual physical embodiments can be produced. As such, some of these drawings contain intricate details that are not essential for an understanding of these embodiments but will convey useful information to one of skill in the art. Therefore, not all parts shown in the drawings will be referenced specifically. Furthermore, to aid clarity and to avoid numerous leader lines from cluttering the drawings, not all reference numerals will be shown in all of the drawings. In addition, some of the features are removed from some views to further aid clarity.

DETAILED DESCRIPTION

Reference is first made to FIG. 1, which is a simplified schematic diagram of a media item presenter 10 (in the form of a banknote presenter) according to one embodiment of the present invention.

The banknote presenter 10 comprises: a chassis 12, a removable nose 14, a banknote transport unit 16 for coupling to a pick unit (not shown) of a dispenser (not shown), a multi-compartment purge bin 18, a carriage 20, a cam block 22, a registration device 24, a removable track 26, and a control board (shown by dotted line 28).

The chassis 12 includes a central track 30 located on an upper area thereof. The removable nose 14 includes a nose track 32 extending from a coupling end 40 of the nose 14 to a presenting end 42 of the nose 14, and aligning with the central track 30 to provide a continuous track. The removable track 26 is located at a non-presenting end (referred to herein as the blank end) 44 of the chassis 12. The blank end 44 is the end opposite the end of the chassis 12 from which the nose 14 extends (referred to herein as the nose end 46). The distance between the coupling end 40 and the nose end 46 is approximately equal to the length of the removable track 26.

The removable track 26, the central track 30, and the nose track 32 are all linearly aligned and coupled so that they combine to provide a presenting track (illustrated by arrow 48) extending from the blank end 44 of the chassis 12 to the presenting end 42 of the nose 14. The carriage 20 is linearly moveable along the length of the presenting track 48.

Although only one presenting track 48 is illustrated, the presenter 10 includes two removable tracks 26 and two central tracks 30, and the removable nose 14 includes two nose tracks 32, so that the chassis 12 includes two parallel presenting tracks 48, each located on an opposite side of the chassis 12. The carriage 20 simultaneously engages with both presenting tracks 48 (each of two opposing sides of the carriage 20 engages with a different one of the presenting tracks 48). However, for clarity only one presenting track 48 is illustrated in FIG. 1.

Figure 2C:
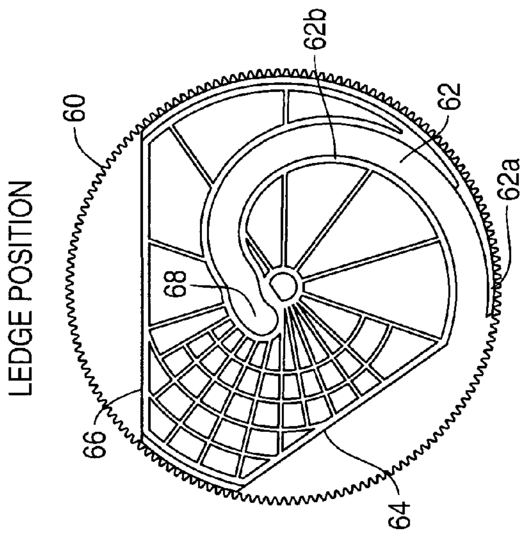
FIGS. 2A to 2C are diagrams illustrating a part (the cam block) of the media item presenter of FIG. 1 in three different operational positions.
Figure 2B:
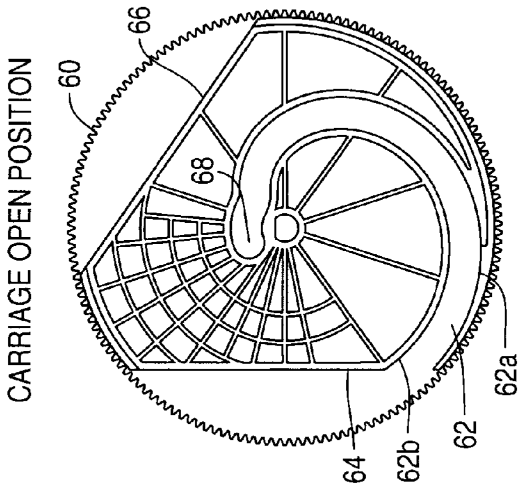
Figure 2A:
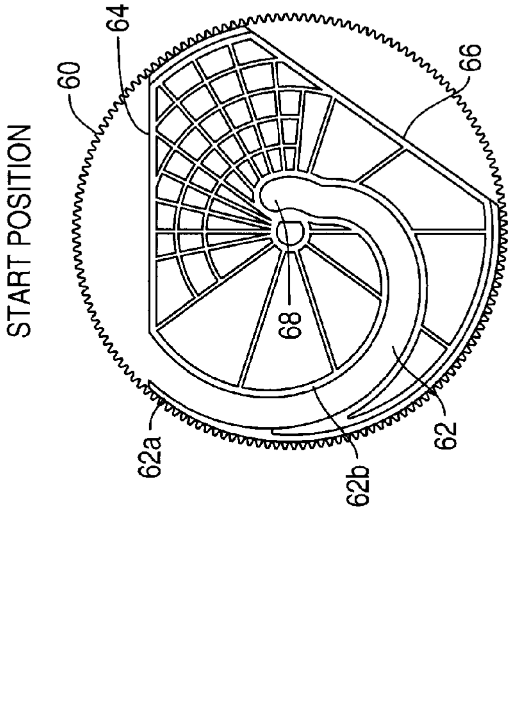

Reference will now also be made to FIGS. 2A to 2C, which are three diagrams illustrating the cam block 22 in three different operational positions.

The cam block 22 comprises a circular block of plastics material. The cam block 22 includes a toothed circumference 60 for receiving drive from a cam motor (not shown) driven by the control board 28. This enables the cam block 22 to be rotated either clockwise or anti-clockwise, as desired.

The cam block 22 defines a curved cam track 62, a straight lead-in track 64 extending from a point on the circumference of the cam block 22 to the curved track 62, and a ledge track 66 extending from one point of the circumference of the cam block 22 to an opposite point on the circumference of the cam block 22 (that is, the ledge track 66 is a chord). The curved cam track 62 ends at an offset centre point 68. The curved cam track 62 includes a downwards cam surface **62*a* (for moving a cam follower down) opposite an upwards cam surface 62*b*** (for moving a cam follower up).

Figure 3A:
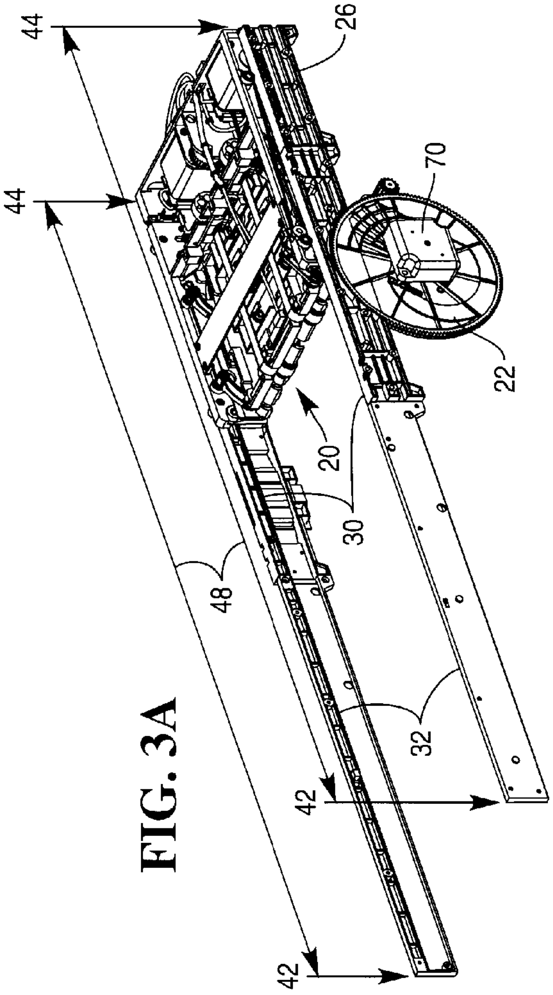
FIGS. 3A to 3D are diagrams illustrating other parts (the presenting track, the cam block, and the carriage) of the media item presenter of FIG. 1 in four different positions.
Figure 3B:
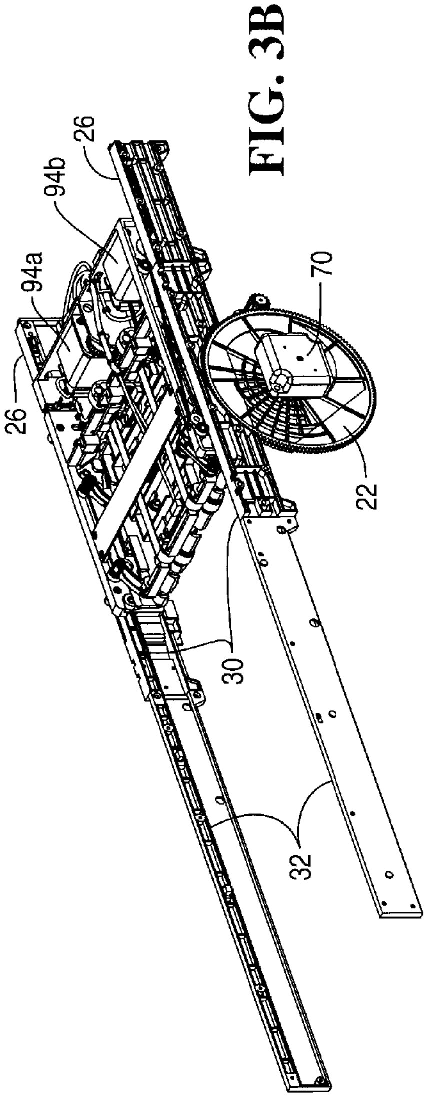
Figure 3C:
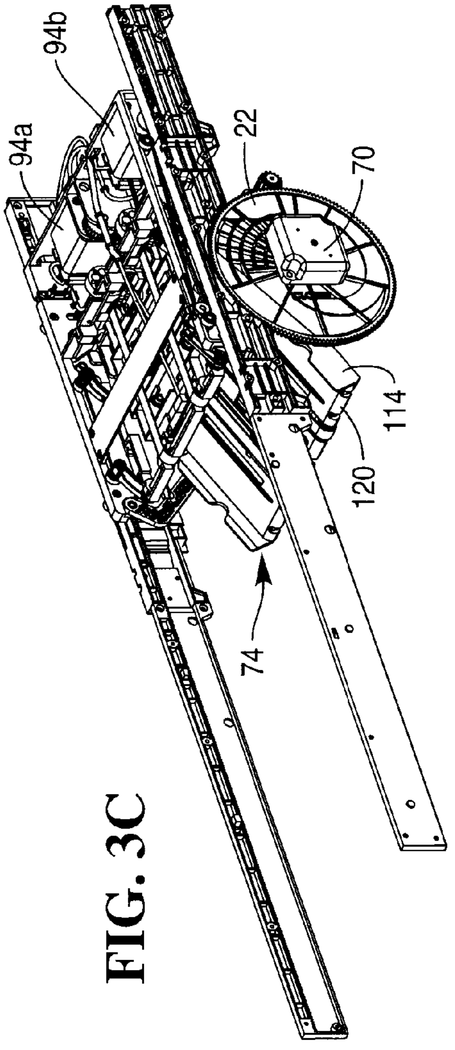
Figure 3D:
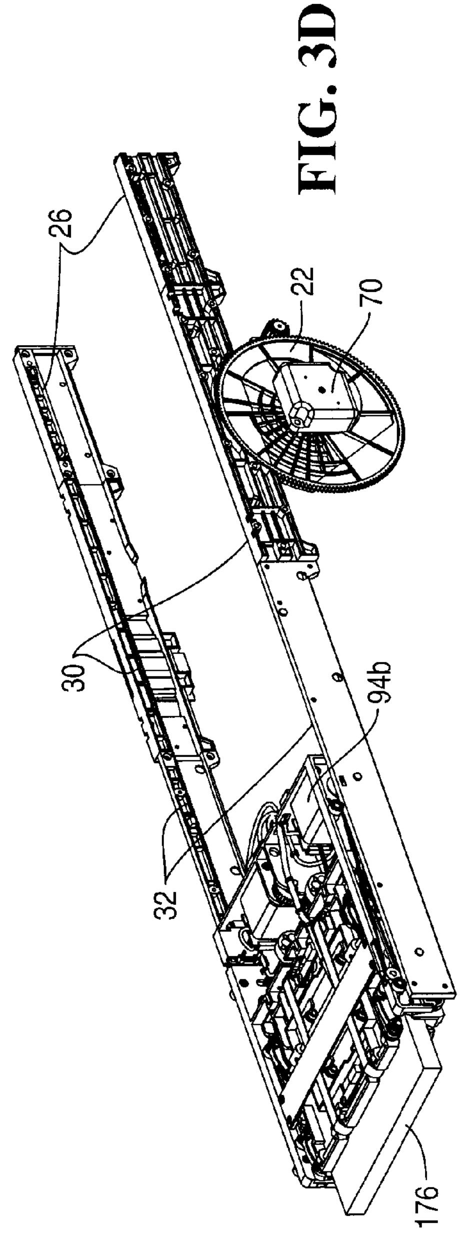

Reference will now also be made to FIGS. 3A to 3D, which illustrate the presenting track 48, the cam block 22, and the carriage 20 in four different positions. The four positions are: present purge position (FIG. 3A); loading position, carriage closed (FIG. 3B); loading position, carriage open (FIG. 3C); and present position (FIG. 3D).

FIGS. 3A to 3D show the presenting track 48 (formed by the nose track 32, the central track 30, and the removable track 26), the cam block 22, a cam block position sensor 70, and the carriage 20 mounted on the presenting track 48 for linear movement therealong. The cam block position sensor 70 may use a magnetic sensor that co-operates with a magnetic target mounted on a shaft on which the cam block 22 is mounted. This enables the cam block position sensor 70 to sense the rotational position of the shaft, and thereby deduce the rotational position of the cam block 22.

FIG. 3A shows the carriage 20 at the present purge position, which is used for transporting a bunch of banknotes into the purge bin 18, where the bunch of banknotes was presented to a customer but was not removed by the customer, as will be described in more detail below.

FIG. 3B shows the carriage 20 at the loading position with the carriage 20 in the closed position. At the loading position, the cam block 22 can be rotated by the cam block motor (not shown) until the cam block 22 is at the cam start position, as shown in FIG. 2A.

FIG. 3C also shows the carriage 20 at the loading position with the carriage 20 in the open position. To move the carriage 20 from the closed position to the open position, the cam block 22 is rotated until it is at the carriage open position, as shown in FIG. 2B.

The carriage 20 will now be described in more detail with reference to FIG. 4, which is a perspective view of the carriage 20 in the open position.

The carriage 20 comprises: a carriage body 72 and a carriage plate 74 movable between an open position at which banknotes can be placed on the carriage plate 74, and a closed position for clamping banknotes between the carriage plate 74 and the carriage body 72.

The carriage body 72 further comprises: a carriage chassis 76; an upper plate 78 coupled to the carriage chassis 76 by four sprung arms 80 that resiliently bias the upper plate 78 towards the carriage plate 74; a first banknote sensor 82; a second banknote sensor 83 (not visible in FIG. 4), and a third banknote sensor 84; an upper transport section (shown generally by arrow 90) mounted to the upper plate 78 and including a plurality of stretchable belts 92; and a pair of motors 94*a,b* mounted on the carriage chassis 76 for moving the carriage 20 along the presenting track 48 (motor 94*a*) and for energizing the upper transport section 90 (motor 94*b*).

The carriage body 72 is coupled to the carriage plate 74 by a linkage (shown generally by arrow 96). The linkage 96 comprises a pair of link arms (entrance link arms) 98 coupling the carriage plate 74 to the carriage body 72 at one end (the media entrance end) 100 and a pair of link arms (non-entrance link arms) 102 coupling the carriage plate 74 to the carriage body 72 at the opposite end (the non-entrance end) 104.

The entrance link arms 98 are longer than the non-entrance link arms 102 to ensure that the entrance end 100 is lower than the non-entrance end 104 when the carriage is open.

Each of the banknote sensors 82, 83, 84 includes a light source aligned with a corresponding prism 86 (only one of the two prisms is shown in the drawings). The first and third banknote sensors 82,84 can detect any banknotes present at the media entrance end 100 or the non-entrance end 104.

The carriage body 72 also includes two pairs of drive cogs 106, each drive cog pair 106 being mounted on a shaft extending from one each side of the carriage chassis 76 to the other side of the carriage chassis 76. The drive cogs 106 engage with the presenting tracks 48 and are rotated by one of the pair of motors 94 (the carriage moving motor 94*a*) to move the carriage 20 either forwards (towards the presenting end 42) or backwards (towards the blank end 44) along the presenting track 48, depending on the direction of rotation of the carriage moving motor 94*a*.

The carriage plate 74 further comprises: an upper surface 108, a lower transport section 110 (including a pair of stretchable endless belts 112), a pair of sidewalls 114 upstanding from the lower transport section (shown generally by arrow 110) and a cam follower (in the form of plain bearing mounted on a pin) 116 extending laterally from the sidewalls 114 and into the presenting track 48. There are actually two pin-mounted bearings 116*a,b*, one on each side of the carriage plate 74; however, only one of these (pin mounted bearing 116*a*) is used as a cam follower. The other pin-mounted bearing 116*b* is not used as a cam follower, but it is used to maintain the carriage plate 74 in the closed position as the carriage 20 moves along the presenting track 48 (other than at the loading position).

The carriage plate 74 further comprises a bumper 120 at the media entrance end 100 defining a plurality of recesses 122.

Reference will now also be made to FIGS. 5 to 8, which are illustrations of the carriage 20 and the registration device 24 from different viewpoints.

The registration device 24 comprises a bracket 130 coupled to the chassis 12; a support plate 132 pivotably coupled to the bracket 130 by a pair of pivot points 134; and a plurality of fingers 136 mutually coupled to a base 138, which is slidably coupled to the support plate 132 by a spring (not shown) that biases the fingers 136 towards the pivot points 134. In addition, the pivot points 134 include a spring (not shown) to bias the support plate 132 towards a generally horizontal position, as shown in FIG. 5.

The fingers 136 are disposed on the base 130 to align with the recesses 122 on the carriage plate 74.

When the carriage plate 74 is moved to the open position then the fingers 136 interlace with the bumper 120 by entering the bumper recesses 122 (best shown in FIG. 8).

Drive circuitry 144 is provided on the carriage 20 to control the motors 94. The drive circuitry 144 is connected to the control board 28 by a flexible umbilical connector (not shown).

Figure 9:
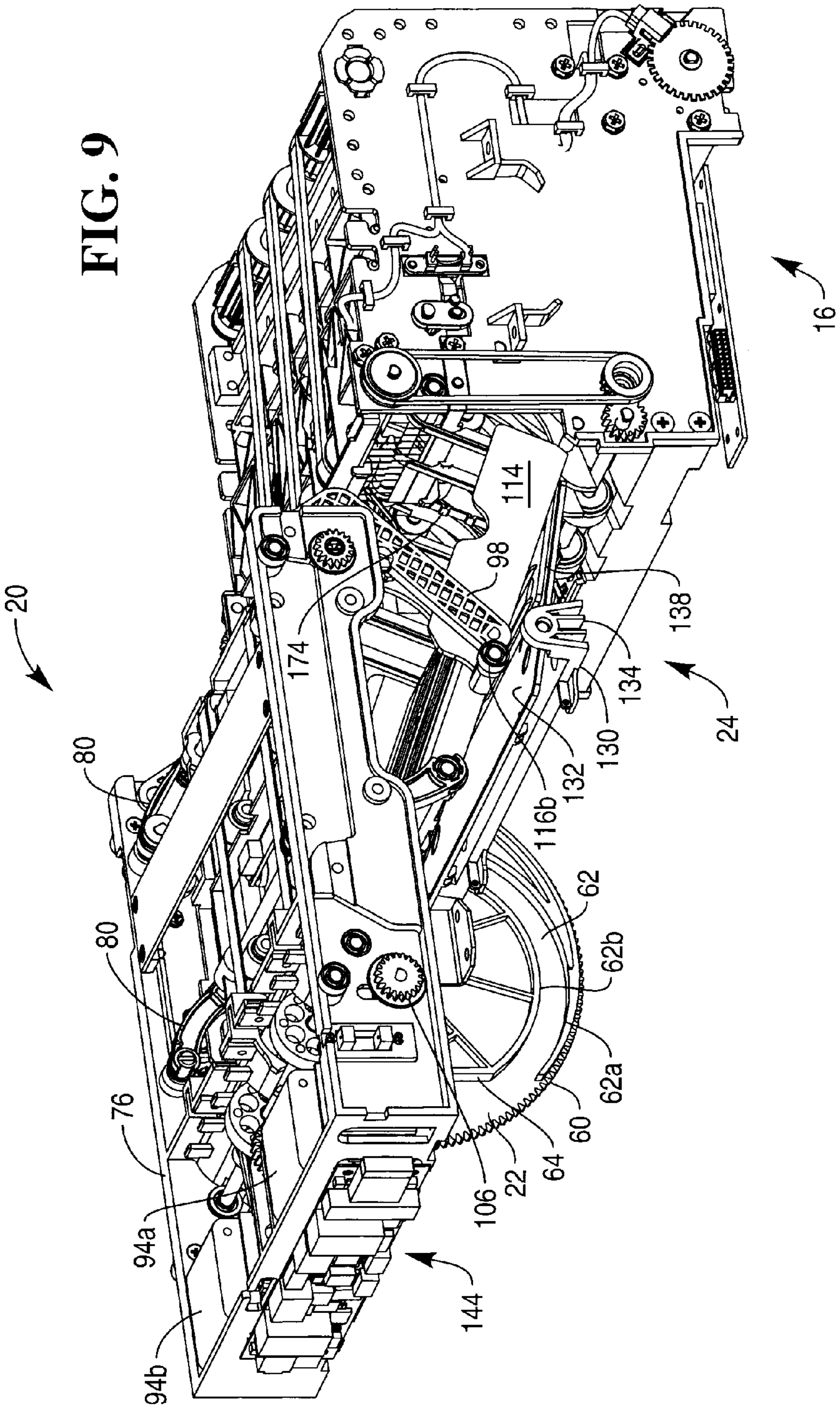
FIG. 9 is a perspective view of those parts (the carriage, the cam block, the registration device, and the media transport unit) of the media presenter of FIG. 1 that are used to create a bunch of media items.
Figure 10:
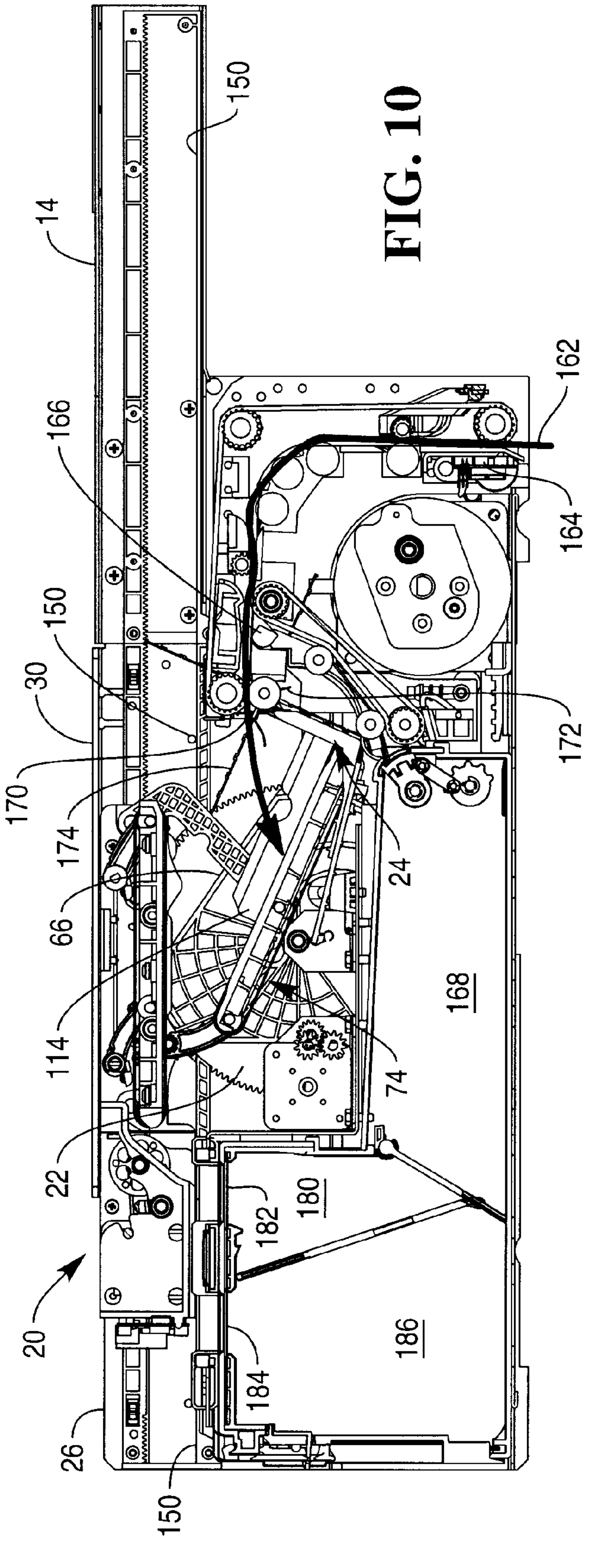
FIG. 10 is a side view of the media presenter of FIG. 1.

Reference is again made to FIGS. 3A to 3D, and FIG. 3E and also to FIGS. 9 and 10, which illustrate the carriage 20 in the open position interlaced with the registration device 24 and aligned with the banknote transport unit 16.

Figure 3E:
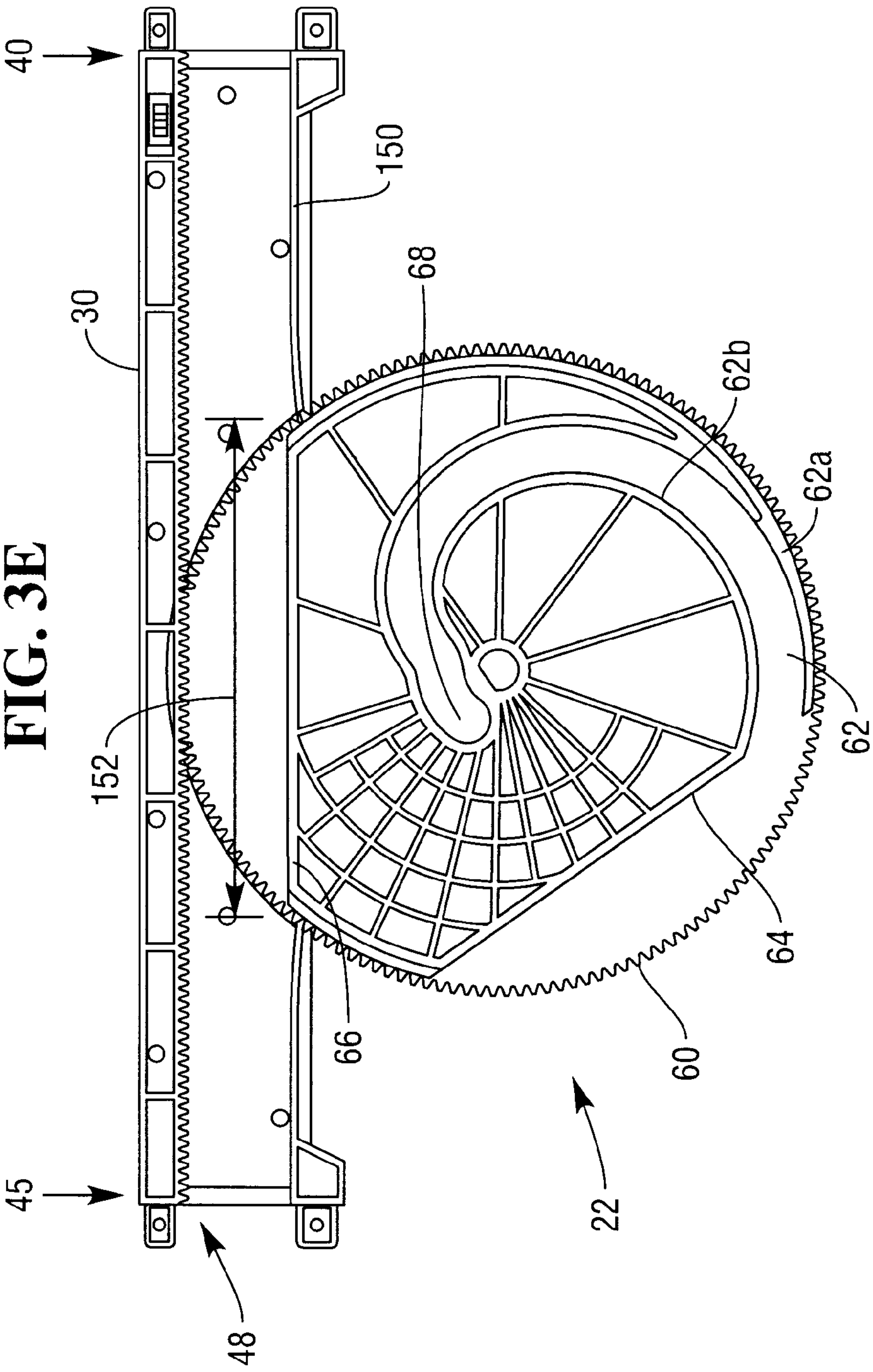
FIG. 3E is a diagram illustrating the cam block and part of the presenting track, with the cam block in a ledge position.
Figure 6:
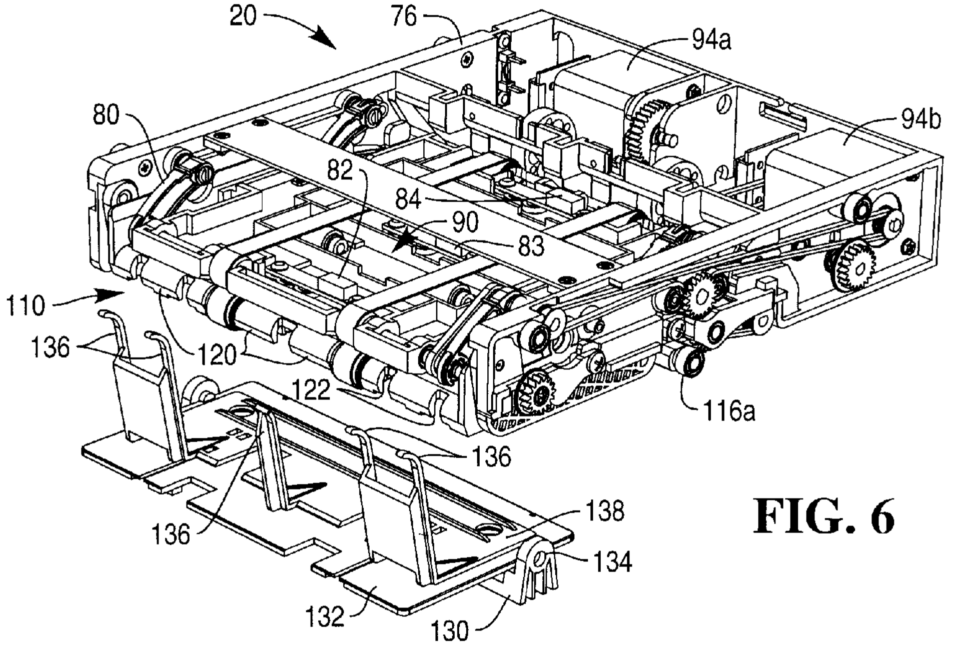
FIG. 6 is a perspective view of the carriage and registration device of FIG. 5, with the carriage in the closed position.

The presenting track 48 includes a track shelf 150 (best seen in FIG. 10) extending from the presenting end 42 to the blank end 44 except for a cam block gap 152 (FIG. 3E).

Reference is also made to FIGS. 2A to 2C, and 3E. When the carriage 20 is moved along the presenting track 48, the track shelf 150 prevents the carriage plate 74 from opening. However, there is a gap (the cam block gap 152) in the track shelf 150. This gap can be filled by aligning the ledge track 66 with the track shelf 150. This occurs when the cam block 22 is rotated to the straight track (or ledge) position, as shown in FIG. 2C. The ledge position is attained by rotating the cam block 22 anti-clockwise from the start position (FIG. 2A) by approximately 55 degrees.

When the cam block 22 is in the ledge position (FIG. 2C), the carriage 20 can be moved from the presenting end 42 to the blank end 44 without the carriage plate 74 opening.

If, however, the cam block 22 is rotated to the start position (as shown in FIG. 2A), then the track shelf 150 is only partially completed by the lead-in track 64. If the carriage 20 is moved towards the blank end 44 sufficiently, then the cam follower 116*a* will drop into the cam track 62. However, this is not desirable because moving the carriage plate 74 from the closed position to the open position can be controlled more accurately by stopping the carriage 20 at the junction of the cam track 62 and the lead-in track 64. When the cam follower 116*a* is at the junction of the cam track 62 and the lead-in track 64, then the carriage 20 is in the loading position.

When the carriage 20 is in the loading position, clockwise rotation of the cam block 22 by approximately 270 degrees will cause the cam follower 116*a* to move downwards (by the action of the downward cam surface 62*a* pushing an upper surface of the cam follower 116*a* down) until the cam follower 116*a* reaches the offset centre point 68, at which point the carriage 20 is in the open position (as shown in FIGS. 2B, 3C, 4 and 7 to 10).

As the carriage plate 74 moves towards the carriage open position, the bumper 120 engages with the registration device 24 and interlaces the bumper recesses 122 with the fingers 136. Continued movement of the carriage plate 74 to the open position causes the bumper 120 to pivot the support plate 132 downwards (best seen in FIG. 7) and to urge the base 138 away from the pivot points 134. This causes the fingers 136 to provide a registration edge 160 (illustrated by a broken line in FIG. 8) against which banknotes can be stacked.

Stacking of banknotes on the carriage plate 74 will now be described with reference to FIGS. 9 and 10, which illustrate the banknote transport unit 16 aligned with the carriage 20 in the open position and the registration device 24 fully deflected by the bumper 120.

The banknote transport unit 16 defines a main banknote path 162 (illustrated by an arrow line in FIG. 10) using co-operating stretchable endless belts and rollers (not referenced individually).

The banknote transport unit 16 includes a conventional banknote (note) thickness sensor (NTS) 164 to sense the thickness of each banknote being transported, and to detect any skew of a banknote being transported. The banknote transport unit 16 also includes a divert gate 166 (best shown schematically in FIG. 1). The divert gate 166 is activated to divert any banknote failing the banknote thickness sensor test (implemented by the NTS 164) through an exit aperture 167 in a single banknote purge compartment 168 of the purge bin 18. A banknote may fail the banknote thickness sensor test, for example, because multiple banknotes are being transported as a single banknote, because a banknote has an unacceptably large hole, or because a banknote is skewed beyond an acceptable amount.

If a banknote is not diverted from the main transport path 162 then it is ejected from an exit port 170 of the main banknote path 162 onto the carriage plate 74. The banknote transport unit 16 includes first banknote flickers 172 (difficult to see, but just visible in FIG. 10) at the exit port 170 to flick media items towards the media entrance end 100 of the carriage 20 as banknotes exit the main banknote path 162. The first banknote flickers 170 are relatively short and impart forward acceleration to the banknotes being ejected from the banknote transport unit 16.

The banknote transport unit 16 also includes second banknote flickers 174 at the exit port 170 that are longer than the first banknote flickers 172. The second banknote flickers 174 flick banknotes downwards onto the carriage plate 74 after the banknotes have been ejected from the main banknote path 162.

Each banknote that is sprayed out of the exit port 170 and onto the carriage plate 74 has its lower long edge aligned with the registration edge 160 due partly to the force of gravity acting on the banknote but mostly because of the second banknote flickers 174 urging the sprayed banknote towards the registration edge 160.

Once all of the desired banknotes have been sprayed onto the carriage plate 74, then the cam block 22 can be rotated back to the start position (as shown in FIG. 2A). This involves the cam block motor (not shown) rotating the cam block 22 by approximately 270 degrees in the anti-clockwise direction. When this occurs, the upwards cam surface 62*b* pushes a lower surface of the cam follower 116*a* upwards until the cam follower 116*a* reaches the junction of the cam track 62 and the lead-in track 64. As the cam follower 116*a* rises, the support plate 132 moves back towards a generally horizontal position (due to the spring in the pivot points 134) and the base 138 is urged towards the pivot points 134 by the base spring (not shown). This causes the fingers 136 to track the carriage plate 74 and maintain the registration edge 160 in contact with the stack of banknotes on the carriage plate 74 for part (a first portion) of the carriage plate's path from the closed position to the open position (referred to herein as the closure path).

The entrance link arms 98 and the non-entrance link arms 102 are dimensioned to ensure that the carriage plate 74 (and the stack of banknotes resting thereon) approaches the upper plate 78 at a shallow angle during a second portion of the closure path. This ensures that the stack of banknotes does not slide off the carriage plate 74 when the fingers 136 cease to provide the registration edge 160 for the stack of banknotes. The point at which the fingers 136 cease to contact the banknote stack defines the end of the first portion of the closure path and the start of the second portion of the closure path.

At the end of the closure path, when the carriage plate 74 approaches the upper plate 78, the sprung arms 80 ensure that an appropriate force is applied by the upper plate 78 to most or all of the top surface of the topmost banknote in the stack. This prevents any pinching of the edge of the stack of banknotes. Pinching of the edge of the stack would cause the stack to splay, thereby making the stack more difficult to present reliably to a customer.

When the carriage plate 74 has reached the closed position, the presenter 10 is ready to present the bunch (or stack) of banknotes to a customer.

This is implemented by the carriage moving motor 94*a* rotating the drive cogs 106 on each side of the carriage chassis 76 to move the carriage 20 to the present position (FIG. 3D). When the carriage 20 has reached the present position (as confirmed by position sensors (not shown)), then the belt transport motor 94*b* drives the upper and lower transport sections 90,110 to transport the bunch of banknotes (illustrated as bunch 176 in FIG. 3D) partially out of the media entrance end 100 for removal by a customer.

If the customer removes the banknote bunch then this is detected by the first banknote sensor 82 (which ceases to detect the presence of banknotes at the media entrance), and the carriage moving motor 94*a* drives the carriage 20 back to the loading position, as shown in FIG. 3B.

If the customer does not remove the banknote bunch (or only removes some of the banknotes in the bunch) then this is detected by the first banknote sensor 82 (which continues to detect banknotes at the media entrance). The belt transport motor 94*b* drives the upper and lower transport sections 90,110 in reverse to transport the bunch of banknotes 176 back so that they are fully within the carriage 20.

The control board 28 then moves the carriage 20 to the present purge position (FIG. 3A) using the carriage moving motor 94*a* and the drive cogs 106.

To implement this, it is necessary for the carriage 20 to travel along the presenting track 48 beyond the loading position towards the blank end 44. To be able to do this, the cam block gap 152 must be closed. This is achieved by rotating the cam block 22 to the ledge position, as shown in FIG. 2C. When this has been done, then the carriage 20 can be moved beyond the loading position to the present purge position.

When at the present purge position, the upper and lower transport sections 90,110 transport the bunch of banknotes out of the carriage 20 via the non-entrance end 104 and into a present bunch purge compartment 180 (best shown by FIGS. 1 and 10) of the purge bin 18 via a present bunch slot 182 defined in an upper surface of the purge bin 18. The third banknote sensor 84 detects when the bunch of banknotes 176 has exited the carriage 20. When this occurs, the banknote bunch 176 enters the present bunch slot 182, and the carriage 20 is moved back to the loading position by the control board 28 driving the carriage moving motor 94*a* to rotate the drive cogs 106.

In this embodiment there is a second purge position (the non-present purge position), which is closer to the blank end 44 than the present purge position. This is used for any purge operations in which the bunch of banknotes 176 is never presented to a customer (and therefore there was no possibility of customer fraud). The carriage 20 is located at the second purge position when the non-entrance end is aligned with a non-present bunch slot 184 defined by an upper surface of the purge bin 18. The non-present bunch slot 184 is located above a non-present bunch purge compartment 186. There are a number of reasons why the non-present bunch purge compartment 186 may be used. For example, if insufficient banknotes area available to complete a bunch of banknotes, if there is a power fail during a stacking operation, if the single banknote purge compartment 168 is full and a transported banknote in the banknote transport unit 16 needs to be diverted to the purge bin 18, if a customer cancels the transaction before the bunch is presented, if there is a fault with one of the components and an auto-recovery process needs to be implemented, or if there is an attempted fraud prior to presenting the bunch.

By having separate compartments for bunches of banknotes that were purged because they were not removed by customers, and bunches that were purged because of an internal problem with the cash dispenser, it is easier to identify and reconcile those transactions that were possibly due to customer fraud (that is, the customer removing some but not all banknotes in a bunch).

It will now be appreciated that the presenter 10 described above allows a bunch of banknotes to be loaded into the carriage 20 in a controlled manner, and the carriage 20 can then be moved to a presenting position (FIG. 3D) to present the bunch of banknotes to a customer, or to a present purge position (FIG. 3A) if the customer does not remove all of the banknotes in the bunch.

Figure 11:
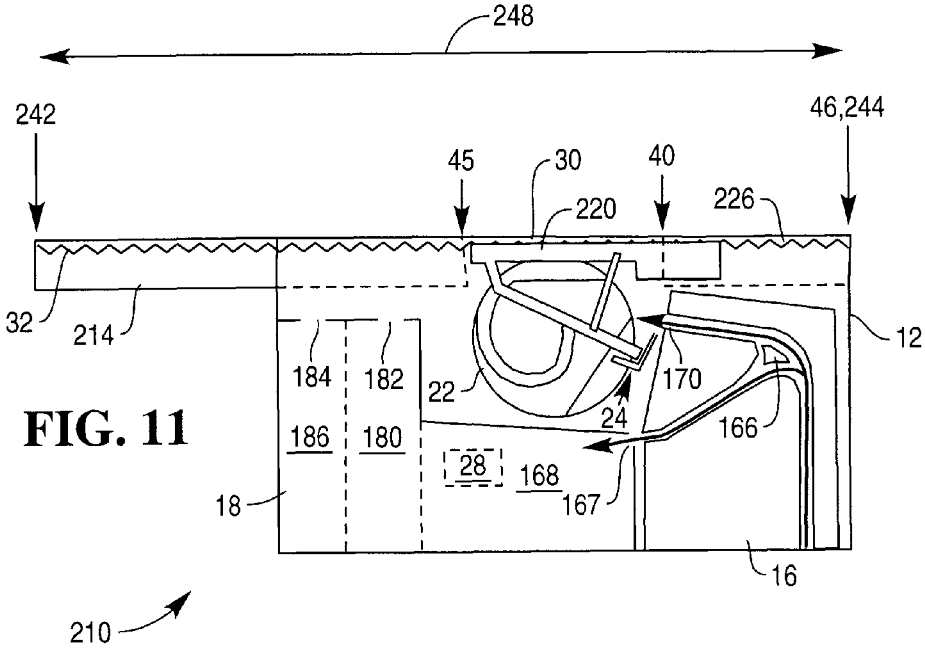
FIG. 11 is a simplified schematic diagram of a front access media item presenter according to another embodiment of the present invention.

The presenter 10 described above also has the advantage that it can be reconfigured for use in a front access dispenser, as will now be described with reference to FIG. 11, which is a simplified schematic diagram of a front access banknote presenter 210 according to another embodiment of the present invention.

The parts used in the presenter 210 are almost all identical to those of banknote presenter 10.

In presenter 210, the positions of the chassis 12, the banknote transport unit 16, the purge bin 18, the cam block 22, the registration device 24, and the central track 30 are identical to the positions of the corresponding parts in the presenter 10. The same reference numerals have been used because the parts are identical.

The difference between presenter 210 and presenter 10 is that: (i) the carriage 220 in presenter 210 is configured differently to the carriage 20 in presenter 10; (ii) the removable nose 214 in presenter 210 is located on the opposite side of the chassis 12 to the removable nose 14 in presenter 10; and (iii) the removable track 226 in presenter 210 is located on the opposite side of the chassis 12 to the removable track 26 in presenter 10.

The removable nose 214 and the removable track 226 are identical to the corresponding parts in presenter 10, their positions are just exchanged, so they will not be described in detail herein. However, this means that a presenting end 242 and a blank end 244 are on opposite sides of the presenter 210 to the presenting end 42 and blank end 44 of presenter 10. The new presenting track 248 is the same length as presenting track 48 but protrudes from the opposite side of the presenter to presenting track 48.

The carriage 220 is configured differently to the carriage 20, although the same parts are used.

Reference is now made to FIGS. 12 to 18, which are drawings of the carriage 220 from different views. Carriage plate 74 is unchanged, but the carriage body 272 has been rotated through 180 degrees (relative to carriage body 72). In addition, the linkage has been reconfigured.

Figure 7:
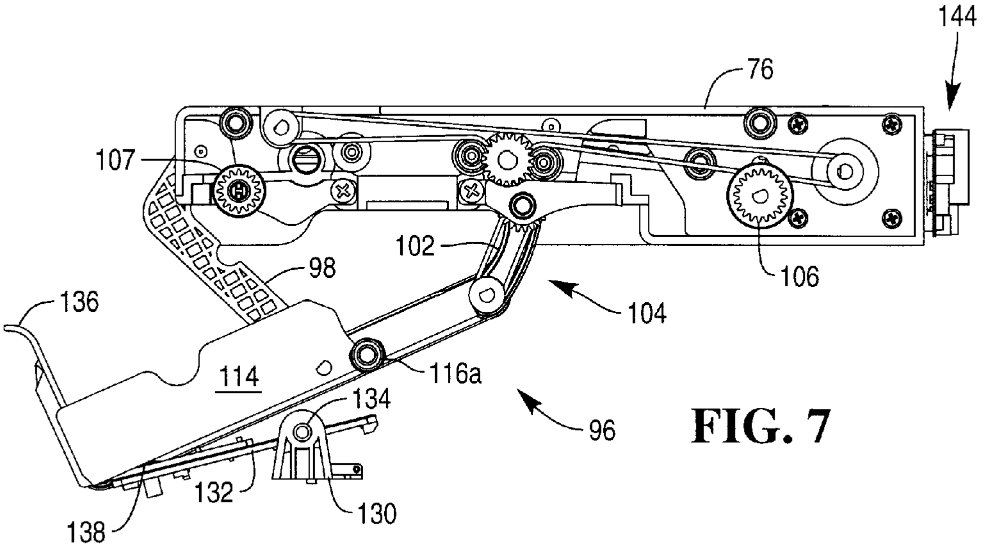
FIG. 7 is a side view of the carriage and registration device of FIG. 5, with the carriage in the open position.
Figure 15:
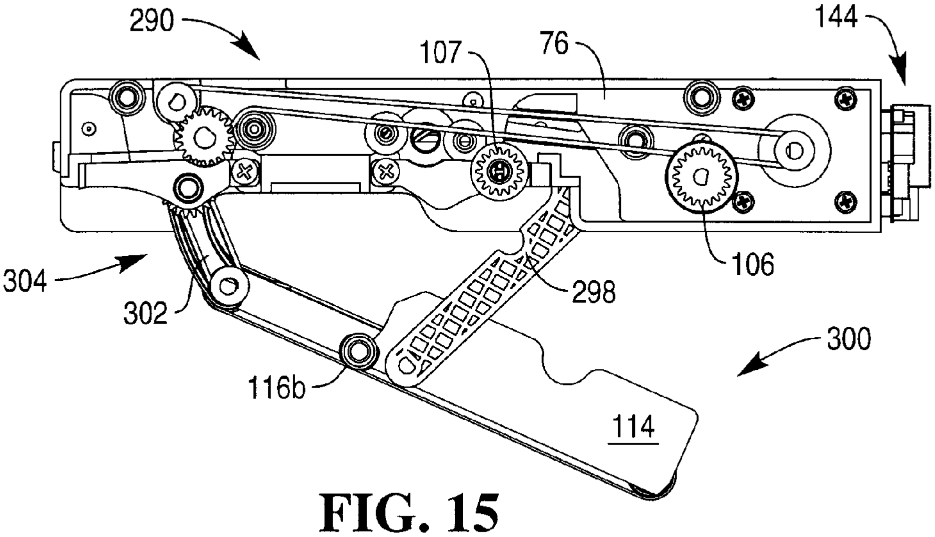
FIG. 15 is a right-side view of the carriage of FIG. 12 in the open position.
Figure 16:
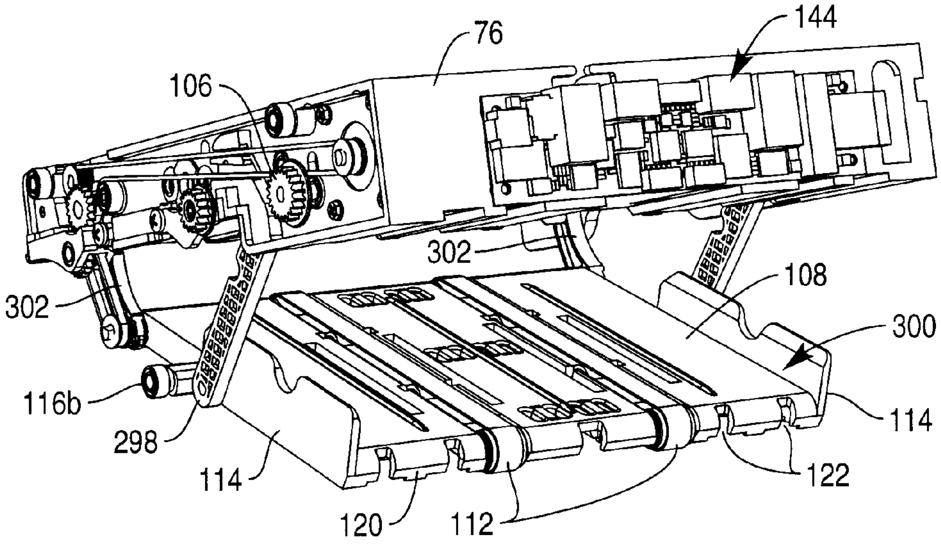
FIG. 16 is a view from the front and to one side of the carriage of FIG. 12 in the open position.
Figure 17:
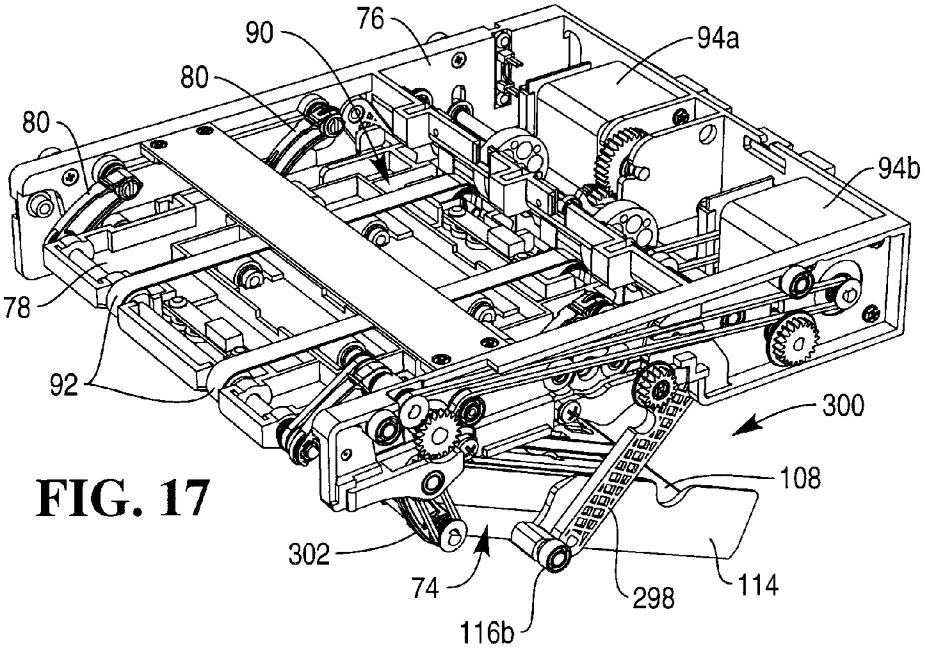
FIG. 17 is a view from the rear and to one side of the carriage of FIG. 12 in the open position.
Figure 18:
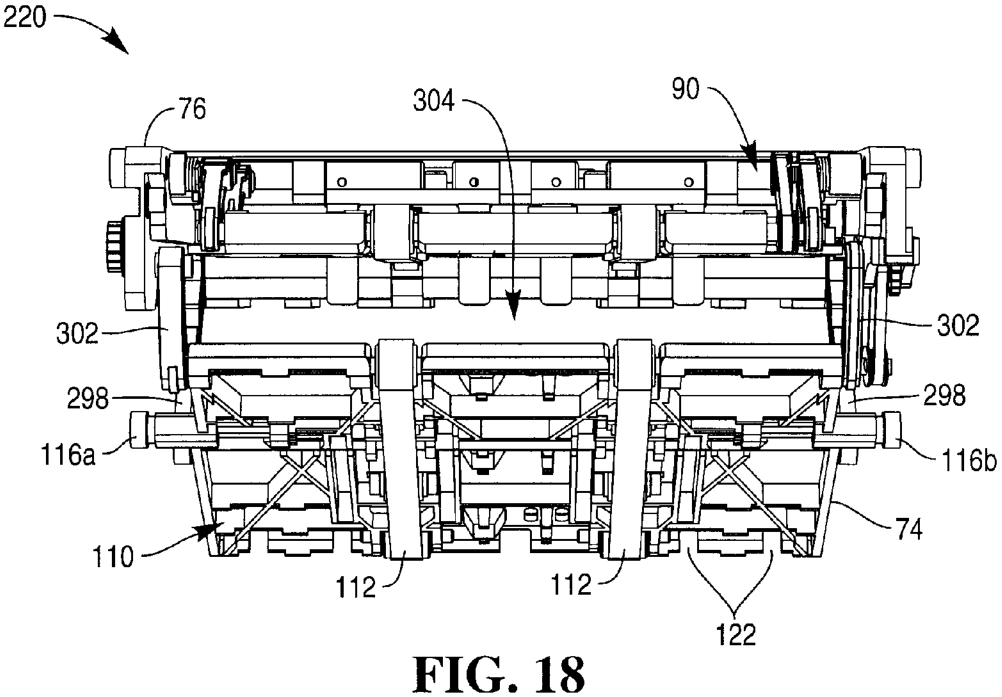
FIG. 18 is a view from the rear of the carriage of FIG. 12 in the open position.

In carriage 20, the entrance link arms 98 are mounted further away from the pair of motors 94 than the non-entrance link arms 102; whereas, in carriage 220, the entrance link arms 298 are mounted nearer the pair of motors 94 than the non-entrance link arms 302 (Best seen by comparing FIGS. 14 and 15 with FIG. 7). This is because the entrance end 100 in carriage 20 is distal from the pair of motors 94; whereas, the entrance end 300 in carriage 220 is proximal the pair of motors 94.

Link arms 98 are identical to link arms 298, the only difference is that they are connected to the carriage body 72,272 at different places. Similarly, the link arms 102 are identical to link arms 302, the only difference is that the link arms 102 couple to one place on the carriage body 72 and the link arms 302 coupled to a different place on the carriage body 272.

The upper transport section 290 is configured slightly differently to the upper transport section 90 because of the routing of some of the belts that drive the stretchable endless belts 92. Although two pin-mounted bearings 116*a,b* are provided on the carriage plate 74, only one of the pin-mounted bearings 116*a* operates as a cam follower. The other pin-mounted bearing 116*b* is used to keep the carriage plate 74 in the closed position and to facilitate transport of the carriage 220 along the new presenting track 248.

The operation of the carriage 220 is the same as that of carriage 20, so will not be described in detail.

It should now be appreciated that the same parts can be used to create a presenter for use in a front access dispenser or a rear access dispenser. Furthermore, by exchanging the positions of a removable nose and a removable track, and by reconfiguring a carriage, a presenter can be transformed from a front access presenter to a rear access presenter and vice versa.

Various modifications may be made to the above described embodiment within the scope of the invention, for example, in other embodiments, the presenter may be used for media items other than banknotes, such as coupons, tickets, passes, vouchers, or the like.

In other embodiments, a different linkage may be used than that described, for example, sliding arms.

In other embodiments, the cam block may have a different shape to that described, for example, square.

In other embodiments, the presenter may include only a single presenting track, not a pair of presenting tracks between which the carriage is mounted.

In the above embodiments, a cam follower is provided on both sides of the carriage plate so that the carriage can be used when rotated through 180 degrees. However, in other embodiments, if a carriage is only ever to be used in one configuration, then only one cam follower may be provided; such a cam follower would be mounted on the side of the carriage plate nearest the cam block.

In the above embodiments, the single banknote purge compartment is separated from the present bunch banknote purge compartment and the non-present bunch purge compartment by dividing walls. In other embodiments, the purge bin may comprise a unitary area having one entrance slot for the single banknote purge operation and another slot for both bunch banknote purge operations.

In other embodiments, a set of removable noses of different lengths may be provided so that the required length of nose can be used. This may be useful where the media presenter is to be used in different self-service terminals, and the self-service terminals have different distances between a dispenser aperture on a fascia and the media dispenser chassis.

The steps of the methods described herein may be carried out in any suitable order, or simultaneously where appropriate.

The terms "comprising", "including", "incorporating", and "having" are used herein to recite an open-ended list of one or more elements or steps, not a closed list. When such terms are used, those elements or steps recited in the list are not exclusive of other elements or steps that may be added to the list.

Unless otherwise indicated by the context, the terms "a" and "an" are used herein to denote at least one of the elements, integers, steps, features, operations, or components mentioned thereafter, but do not exclude additional elements, integers, steps, features, operations, or components.

What is claimed is:

1. A media presenter for presenting media items to a customer, the method comprising:

a chassis including a nose coupled thereto, and including (i) a presenting end distal from the chassis, and (ii) a presenting track extending from the chassis to the presenting end;

a carriage mounted on the presenting track for movement therealong between a loading position at which media items can be loaded onto the carriage and a presenting position at which loaded media items can be presented to a customer, and comprising a carriage body and a carriage plate coupled to the carried body by a rotable linkage supporting movement of the carriage plate between a closed condition and an open condition, the carriage plate including a cam follower; and a cam block defining a cam track and being operable to engage with the cam follower to (i) move the carriage plate to the open condition in which media items can be stacked on the carriage plate when the carriage is at the loading position along the presenting track, and (ii) move the carriage plate to the closed condition in which loaded media items can be clamped between the carriage plate and the carriage body when the carriage is at the loading position along the presenting track.

2. A media presenter according to claim 1, further comprising a track shelf parallel to the presenting track and arranged to support the cam follower to prevent the carriage plate from moving to the open condition, the track shelf further defining a cam block gap at the loading position of the carriage, the cam block being mounted in registration with the cam block gap.

3. A media presenter according to claim 2, wherein the cam block defines a ledge track arranged to align with, and dimensioned to fill, the cam block gap so that when the cam block is rotated to a ledge position to position the ledge track parallel to the track shelf, the ledge track completes the track shelf so that the cam follower is unable to engage with the cam track, thereby allowing the carriage to move beyond the loading position at which the carriage plate can be moved between the closed condition and the open condition.

4. A media presenter according to claim 3, wherein (i) the cam block defines a lead-in track adjacent the cam track, and (ii) the cam block can be rotated to align the lead-in track with the track shelf when the carriage is to be moved to the loading position.

5. A media presenter according to claim 4, wherein the lead-in track is located near a pick end of the presenter and the cam track starts near a handle end of the presenter, so that the carriage can be moved along the lead-in track to the presenting position to present media items to a customer in a rear access dispenser, but the carriage must be moved towards the pick end, and the cam block rotated to the ledge position, prior to moving the carriage to the presenting position to present media items to a customer in a front access dispenser.

6. A media presenter according to claim 1, wherein the cam block comprises a circular block of material.

7. A media presenter according to claim 1, wherein the cam block includes a toothed circumference for receiving drive from a cam motor.

8. A media presenter according to claim 4, wherein the cam block defines a curved cam track starting adjacent the lead-in track and finishing at an offset centre point.

9. A media presenter according to claim 8, wherein the curved cam track defines (i) a downwards cam surface for moving the cam follower down to open the carriage plate, and (ii) an upwards cam surface opposite the downwards cam surface, for moving the cam follower up to close the carriage plate.

10. A media presenter according to claim 1, wherein the cam follower comprises a pin extending laterally from the carriage plate.

11. A media presenter according to claim 1, wherein (i) the cam block is mounted on a shaft, and (ii) the cam block includes a position sensor that senses a target mounted on the cam block shaft to ascertain a rotational position of the cam block.

12. A method of presenting a bunch of media items to a customer, the method comprising:

moving a carriage along a presenting track until the carriage reaches a loading position;

guiding a cam follower on the carriage in a first direction along a cam track to rotate a carriage plate of the carriage to an open position to reveal an upper surface of a carriage plate spatially separated from a carriage body;

transporting individual media items onto the upper surface of the carriage plate to form a bunch of media items;

guiding the cam follower on the carriage in a second direction, opposite the first direction, along the cam track to rotate the carriage plate to a closed position and pinch the bunch of media items between the upper surface of the carriage plate and a lower surface of the carriage body;

moving the carriage along the presenting track until the carriage reaches a present position; and transporting the bunch of media items from the carriage to a customer.

13. A method of presenting a bunch of media items to a customer according to claim 12, wherein the method comprises the further steps of:

detecting that one or more media items in the bunch of media items have not been removed by the customer;

rotating the cam block to a ledge position at which a lead-in track to the cam track is replaced by a ledge track so that the cam follower is not guided along the cam track when the carriage is at the loading position;

moving the carriage along the presenting track from the present position to a purge position; and transporting the detected media items out of the carriage and into a purge bin.

14. A method of presenting a bunch of media items to a customer according to claim 13, wherein the step of moving the carriage along the presenting track from the present position to a purge position includes moving the carriage beyond the loading position.

15. A cam block for use with a carriage in a media presenter for presenting media items to a customer, the cam block defining:

a lead-in track extending from an edge of the cam block to a cam track entrance;

a cam track extending from the cam track entrance to an offset centre point, and defining an upward cam surface and a downward cam surface;

a substantially flat ledge track extending from one outer circumferential edge portion of the cam block to an opposite outer circumferential edge portion of the cam block; and a hub for enabling the cam block to be rotatably mounted on a shaft in the media presenter for presenting media items to a customer;

wherein (i) the cam track is substantially arcuate-shaped, (ii) the upward cam surface of the cam track comprises a substantially inner arcuate-shaped surface which extends from the cam track entrance to the offset centre point, and (iii) the downward cam surface comprises a substantially arcuate-shaped cam track which faces the upward cam surface and extends from the cam track entrance to the offset centre point.

16. A cam block according to claim 15, wherein (i) the edge from which the lead-in track extends comprises an outer circumferential edge portion of the cam block, and (ii) the lead-in track comprises a substantially flat surface which extends from the outer circumferential edge portion of the cam block to the cam track entrance.

* * * * *